Oct. 30, 1962 L. H. POWERS 3,060,873
PLANTER ADJUSTING MEANS FOR REGULATING THE
DISCHARGE OF SEED AND FERTILIZER
Filed March 30, 1960 2 Sheets-Sheet 2
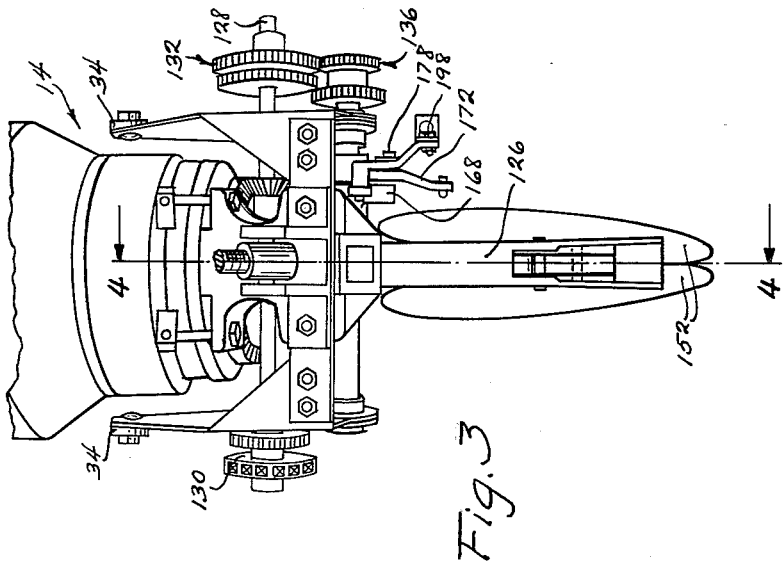
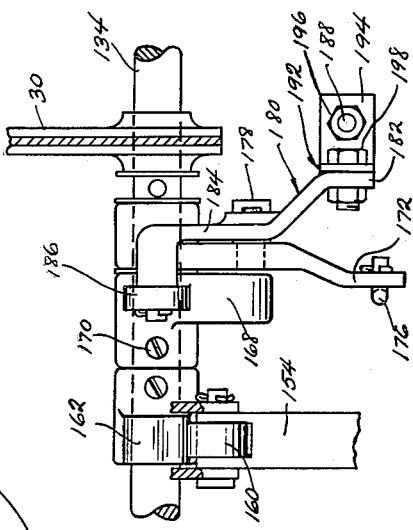
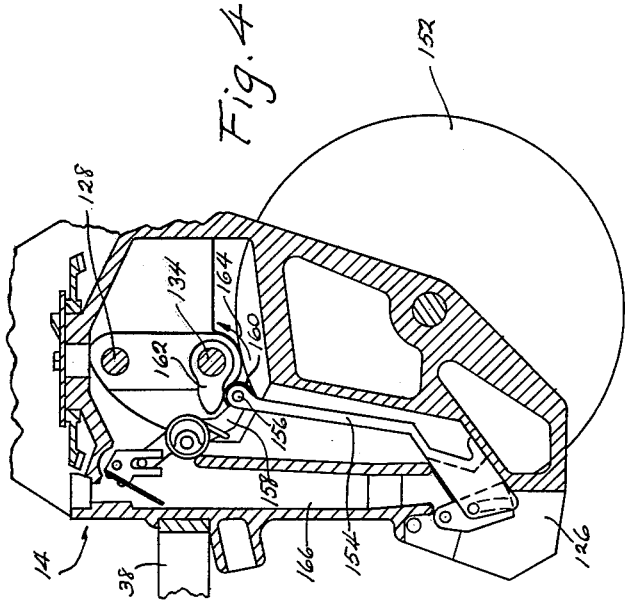
INVENTOR.
LEE H. POWERS
BY

United States Patent Office 3,060,873
Patented Oct. 30, 1962

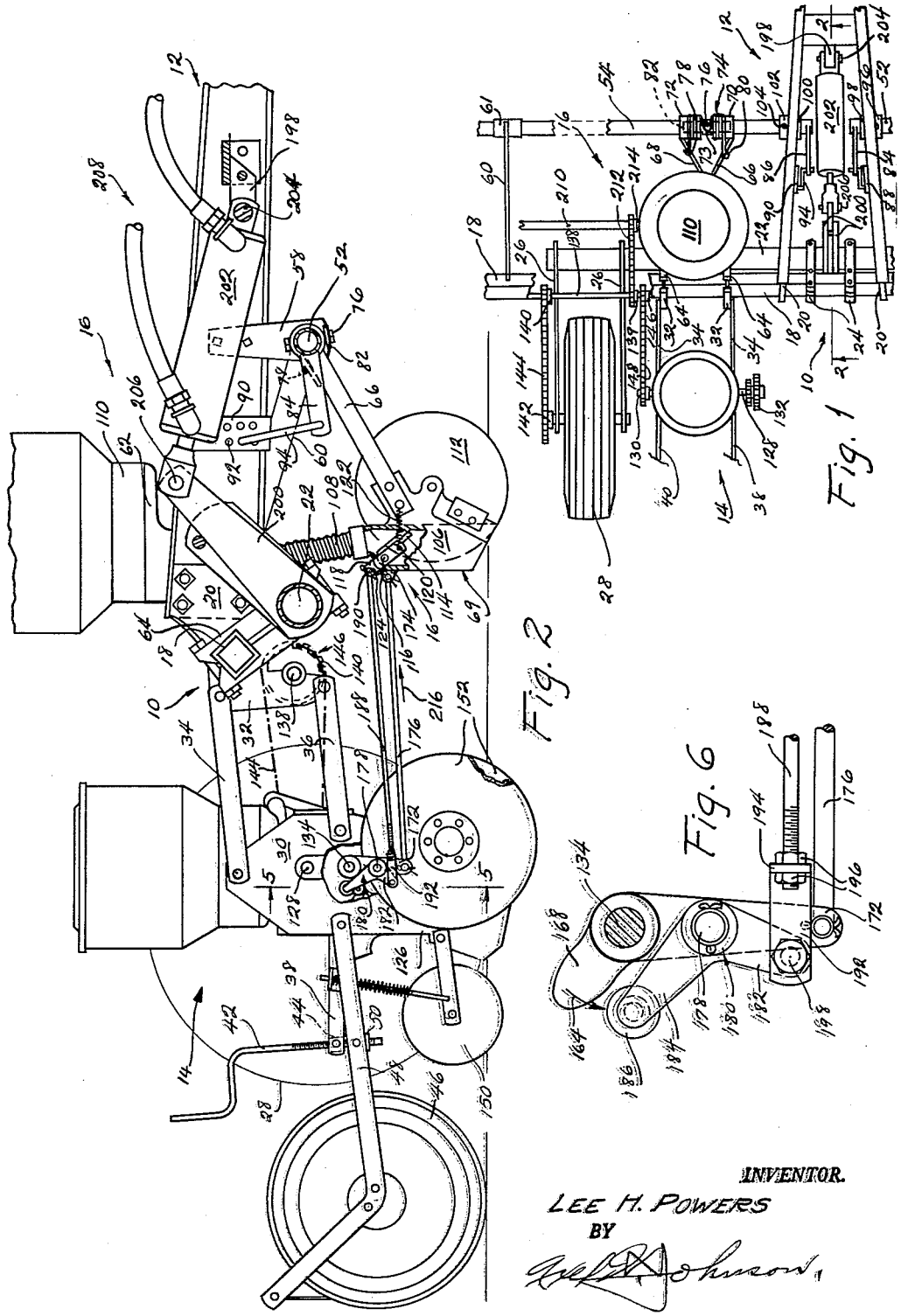

3,060,873
PLANTER ADJUSTING MEANS FOR REGULATING
THE DISCHARGE OF SEED AND FERTILIZER
Lee H. Powers, Rockton, Ill., assignor to J. I. Case Company, Racine, Wis., a corporation of Wisconsin
Filed Mar. 30, 1960, Ser. No. 18,638
9 Claims. (Cl. 111—73)

This invention relates to a seed planting and fertilizing implement, and especially to a combination machine having independent planter and fertilizer units spaced in a fore-and-aft direction.

Combination planters and fertilizers heretofore known, combine the planter unit and the fertilizer unit in one unitary assembly which drops the fertilizer and seed simultaneously. This arrangement is simple and tends to place the seed and fertilizer in the ground at an approximately proper relationship. However, the unitary assembly as above-mentioned does not lend itself to convenient adjustment, vertically or horizontally, of either of the units relative to the other. This lack of means for adjustment results in situations where seed is burned because the fertilizer is too close, or the fertilizer is ineffective because it is too far removed from the seed.

The fore-and-aft spacing of the planter and fertilizer units of this invention, however, requires an accurate control as to the moment of release of seed and fertilizer; briefly, the sequence of operation being as follows:

A deposit of fertilizer is placed in the soil by the fertilizer unit. As the implement advances, the planter unit is actuated to deposit one or more seeds at a predetermined distance from the previously deposited fertilizer. This mode of operation requires accurate coordination of the ground speed with the spacing between the fertilizer and the planter units as well as accurate control in synchronizing the opening of the fertilizer release valve and the seed release valve. This is especially true when the valve control mechanism for both the seed valve and the fertilizer valve is situated in one of the units which is capable of vertical movement relative to the other unit, as is true in this instance. It is also necessary to provide some means of "linking" the two units so that a sudden rise and fall of either unit will not be apt to disturb the timing of deposit of the seed or the fertilizer.

The "front" or "rear" of the implement as described, is understood as being to the right or left respectively, with reference to FIGS. 1 and 2.

An object of this invention is to provide a combination planter and fertilizer implement in which the planter and fertilizer units are spaced fore-and-aft, and are so arranged that they can be adjusted vertically and transversely relative to each other.

Another object is to provide a generally linked relationship between the planter unit and the fertilizer unit so that alternate raising or lowering of either unit, because of uneven ground, will not substantially disturb the timing or synchronization of the dropping of the seed and fertilizer.

Another object is to provide means to adjust the synchronization of the dropping of the seed and fertilizer.

Other objects and advantages will become apparent from the following description taken in connection with the accompanying drawings in which:

FIG. 1 is a fragmentary plan view of a planter-fertilizer implement embracing this invention, and showing one planter unit and one fertilizer unit.

FIG. 2 is an enlarged fragmentary elevational view, partly in section, taken at 2—2 of FIG. 1, showing the planter unit and fertilizer unit lowered to the ground in working position and with parts removed.

FIG. 3 is an enlarged rear elevational view of a portion of a planter unit detached from the implement.

FIG. 4 is a section taken at 4—4 of FIG. 3.

FIG. 5 is an enlarged fragmentary view of the valve actuating mechanism taken at 5—5 of FIG. 2.

FIG. 6 is an enlarged detail of certain mechanism indicated in FIG. 2.

The device embracing this invention comprises a planter unit and a fertilizer unit as a complete operating combination, several such identical combinations being spaced transversely on one frame to provide a complete fertilizer-planter implement. The description will, however, be confined to one such combination.

Referring to FIG. 1, the planter-fertilizer implement embodying this invention comprises generally a frame 10 having a drawbar 12, a planter unit 14 flexibly linked to frame 10 for up-and-down floating movement, and a fertilizer unit 16 also linked to the frame 10 for up-and-down floating movement.

Frame 10 includes a transverse tool bar or cross pipe 18 that extends beyond both sides of drawbar 12 as shown in FIG. 1. Hitch brackets 20—20 are secured to the rear end of drawbar 12 and are welded or otherwise secured to cross pipe 18, the latter comprising the main portion of frame 10.

A transverse rotatable rock axle 22 extends parallel to cross pipe 18 and is journaled in a plurality of brackets 24—24. Brackets 24—24 are carried by cross pipe 18 and are clamped thereto by bolts or secured by other suitable means of fastening.

Two pairs of rearwardly-extending rock axle arms 26—26, only one pair being shown, are welded or otherwise secured to rock axle 22. A transport wheel 28, two of which are provided, only one being shown in FIGS. 1 and 2, is mounted between each pair of the axle arms 26 to support the implement relative to the ground.

Planter units 14, of which there are four, only one being shown, include end plates 30—30, which provide means whereby the unit 14 is supported on frame 10, specifically on cross pipe 18.

A pair of runner hangers 32—32 is secured by bolts or other suitable means of fastening to cross pipe 18, a pair being provided for each planter unit 14. Planter unit 14, is pivoted to hangers 32—32 by a pair of longitudinally positioned upper link members 34—34, and a pair of lower links 36—36 spaced below upper links 34 and shown in FIG. 2. One end of each link member 34 and 36 is pivotally anchored to one of the hangers 32—32. The other ends of link members 34 and 36 are similarly anchored to end plates 30—30.

A pair of depth adjusting brackets 38 and 40 are secured to end plates 30—30 and support a crank 42 and trunnion nut 44.

A press wheel 46 is mounted in a frame member 48. Frame 48 is pivoted to end plates 30—30 to provide vertical swinging and is shown in FIG. 2. A central brace 50 provides a means to anchor crank 42 to frame 48 so that rotation of the crank raises or lowers the press wheel 46 relative to the planter unit 14.

Fertilizer units 16 are positioned forwardly of planter unit 14. Pivot pipes 52 and 54 extend transversely in both directions under drawbar 12, each pipe being journaled in one of a pair of depending pipe supports 56 and 58 secured to drawbar 12. A support is provided for the outer end of each pivot pipe 52 and 54 in the form of a pipe brace such as 60 and having a sleeve 61, only one being shown in the drawing, by which pivot pipes 52 and 54 are supported. Braces 60 are secured at their other ends to cross pipe 18 by any suitable means, as by clamping or welding.

Each fertilizer unit 16 includes a bottom portion 62 supported from pipe 18 by means of brackets 64, the latter being bolted to brackets 32. Drag bars 66 and 68 are freely journaled on pipes 52 and 54, extend downwardly and rearwardly relatively to fertilizer units 16 as shown in FIG. 1, and support fertilizer boots, runners or openers 69, only one being shown. Bars 66 and 68 are formed so as to provide a space intermediate their journal portions 70 and 72. A right-and-left hand torsion spring 74 surrounds pipe 54 at a position intermediate portions 70 and 72 and has a central loop 73. A bolt 76 passes through pipe 54 and through loop 73 to prevent rotation of spring 74 about pipe 54. Spring 74 is formed to terminate in hook portions 78 and 80 which engage the upper edges of bars 66 and 68 respectively, and function to urge the bars downwardly or counterclockwise as seen in FIG. 2. A stop member 82 is also secured by bolt 76 beneath pipe 18 as shown in FIG. 2, and serves to limit the downward swinging of bars 66 and 68.

Adjusting arms 84 and 86 are secured, in this instance, by welding, one to each of pipes 52 and 54 respectively. Adjusting plates 88 and 90 are provided, one being secured to the inner side of each of the members of drawbar 12 by suitable means. Plates 88 and 90 are each provided with a series of adjustment holes 92 as shown in FIG. 2. Adjusting arms 84 and 86 each have a single hole similar to holes 92. Adjusting rods or links 94 are provided each of which has both ends bent at right angles to the body of the link. Adjusting arms 84 and 86 are secured at a desired angular position relative to drawbar 12 by inserting a bent end of one of links 94 in each of the holes in arms 84 and 86, and inserting the other bent ends of links 94 in appropriate holes 92 in plates 88 and 90 respectively. Links 94 are secured in plates 88 and 90 and arms 84 and 86, by cotters or other means of fastening.

The adjustment obtained by moving the bent ends of links 94 from one to another of holes 92 in plates 88 and 90, changes the force of springs 74 and 78 and shifts stop member 82 into various angular positions, thereby determining the maximum depth of ground penetration of openers 69 when arms 66 and 68 are urged against stop 82 by spring 74.

Means is provided on pivot pipes 52 and 54 to permit transverse adjustment of fertilizer openers 69 relative to planter units 14. This means comprises sleeves 96, 98, 100 and 102 as shown in FIG. 1, which sleeves are freely fitted on pivot pipes 52 and 54. Sleeves 96, 98, 100 and 102 are provided with set screws 104. When the transverse position of fertilizer openers 69 has been determined by shifting pipes 52 and 54 axially, the sleeves are secured one on each side of pipe supports 56 and 58, fixing the axial position of pivot pipes 52 and 54, and thereby the lateral position of the fertilizer openers relative to planter units 14.

Each fertilizer opener 69 comprises an opener shank 106 which is bolted or otherwise fixed to above-mentioned bars 66 and 68. A flexible fertilizer tube 108 connects fertilizer bottom 62 with opener shank 106 to permit fertilizer to flow from the box 110 to shank 106 and then to the ground. An opener disk 112 is journaled on shank 106 and serves to produce a furrow into which the released fertilizer is deposited.

Shank 106 has a valve 114 fixed on a shaft 116 journaled in shank 106, and which in turn carries a T arm 118. Arm 118 has downwardly and upwardly extending portions, the lower portion having an aperture 120. A tension spring 122 extends from aperture 120 forwardly to one of the bolts passing through bars 66 and 68, and serves to maintain valve 114 in a normally closed position. An aperture 124 is provided in the upper portion of arm 118 for a purpoe to be later indicated.

The planter unit comprises a shank 126 constituting the main body or foundation thereof, and is carried on the above-mentioned links 34 and 36.

A seed shaft 128 is journaled in end plates 30 of planter unit 14 and serves by its rotation to actuate a seed counting mechanism in well-known manner, not shown. Shaft 128 carries a sprocket 130 at one end from which it is driven, and extends transversely of the direction of travel of the implement and carries a two-step cluster gear 132 at the other end. A rotatable valve shaft 134 is journaled below shaft 128 and carries a two-step cluster gear 136. Gear 132 is slidable on shaft 128 so as to selectively engage the steps thereof with the steps of gear 136 as shown in FIG. 3 and provide means to change the speed of rotation of shaft 134 relatively to that of shaft 128, and thereby change the time interval between actuations of the valve mechanism which will be further described. When gears 132 and 136 have been positioned as desired, gear 132 is secured by a pin inserted through the gear and shaft 128.

Seed shaft 128 is driven from above-mentioned wheel 28 through a transverse drive shaft 138 journaled beneath cross pipe 18, and provided with a sprocket 140. Wheel 28 carries a sprocket 142, and a chain 144 is trained over sprockets 140 and 142. Thus rotation of wheel 28 will rotate shaft 138. A cluster sprocket 146 is fixed to shaft 138 and is axially adjustable. A chain 148 is trained over sprocket 130, and one end of the sprockets on cluster 146 and transmits the motion of shaft 138 to shaft 128. A seed press wheel 150 is provided as shown, but which is not an element of this invention and will not be further described.

Planter unit 14 carries a pair of opener disks 152 of the usual type which are mounted one on each side of the shank 126 as shown in FIG. 2.

FIG. 4, which is taken at 4—4 of FIG. 3, shows the elements of the planter seed ejecting means which comprises a valve plunger 154 which is, in turn, journaled on a pin 156 in a crank 158 and having a follower roller 160 thereon which engages a valve trip or seed planting cam means 162 secured to shaft 134. It will be clear that rotation of shaft 134 in the direction of the arrow 164 will reciprocate plunger 154 and release in well-known manner, seed that has previously been dropped into seed tube 166 by the usual seed plate mechanism not forming part of the present invention. Shaft 134 has also mounted thereon a fertilizer trip or second cam 168 adjoining the valve trip cam 162 as shown in FIGS. 2 and 5. Cam 168 is secured to shaft 134 by means of a set screw 170, in order to permit angular adjustment of cam 168 relative to cam 162 thereby providing the means to regulate the timing between the deposit of fertilizer and the dropping of seed, the normal relative positions of cams 162 and 168 being such as to bring about the desired interval between the dropping of fertilizer and seed, in the embodiment illustrated, cams 162 and 168 being disposed about 90° apart.

A depending arm or fulcrum supporting lever 172 is freely journaled in the present instance on shaft 134 so as to swing thereabout adjacent cam 168 as shown in FIGS. 1, 5 and 6. Arm 172 is linked to fertilizer shank 106. A lug 174 forms a part of shank 106 as shown in FIG. 2, and which lug is provided with an aperture, and a similar aperture is provided in the lower end of arm 172. A tie or anchor means 176, in the present instance having right-angular bent ends, connects the apertures of lug 174 and arm 172 said bent ends constituting pivots or pivotal connections for tie 176 to connect it to lug 174 and arm 172. Thus arm 172 will be compelled to swing and respond to any horizontal displacement of shank 106 when the latter raises or lowers. Conventional cotters serve to retain tie rod 176 in place in lug 174 and arm 172. Arm 172 has fixed therewith, a stud or fulcrum 178, and a rocker or fertilizer valve lever or bell crank 180, of the shape shown in FIGS. 2, 5 and 6 is pivoted or fulcrumed on stud 178.

Bell crank 180 comprises a lever having a lower arm 182 and an upper arm 184. Upper arm 184 is bent as shown in FIG. 5, and terminates in a follower roller 186 which roller is in position to be engaged by fertilizer trip cam 168 as the latter rotates with shaft 134.

A fertilizer valve actuating means comprising a link or rod 188 is provided, having in this instance a rightangular end 190 which is inserted in aperture 124 in arm 118, and secured by a cotter or similar means, end 190 constituting a pivot, or pivotal connection of rod 188 to arm 118. The other end of rod 188 is threaded and terminates at a point adjacent lower arm 182. A bracket 192 of flat material is formed in this instance with a rightangular bend providing a portion 194 to receive the threaded portion of rod 188 to permit adjustment, and a pair of lock nuts 196 clamps portion 194 to rod 188 and secures the adjustment. An aperture is provided in bracket 192 and a pivot stud 198 is fitted therein and threaded into lower arm 182, but allowing bracket 192 to pivot freely, forming a pivot or pivotal connection between arm 182 and rod 188. Thus rocking of bell crank 180 by reason of the action of cam 168 will reciprocate rod 188 and thereby rock lever 118 and open fertilizer valve 114.

A ram anchor 198 is secured between the side members of drawbar 12. Rock axle 22 is provided with a lift arm 200 secured thereto by welding or other suitable means. A hydraulic ram 202 is mounted in drawbar 12 by means of a pin 204 in anchor 198 and a pin 206 in arm 200. The usual hose connections 208 are connected between the ram 202 and the usual source of hydraulic fluid supply on the tractor.

It will be clear that with drawbar 12 supported on a tractor, wheels 28 will support the implement from the ground. The height of frame 10 relative to the ground can be varied by actuating ram 202, thereby rotating rock axle 22 on which wheels 28 are mounted. Rotating rock axle 22 counterclockwise as seen in FIG. 1 will tend to press wheels 28 downwardly, but since the latter are supported on the ground and cannot go down, rock axle 22 and its attached parts, including drawbar 12 and frame 10 will be forced to go up so that the machine will be raised by this action.

When it is desired to adjust fertilizer opener 69 for height, adjusting rod 94 is moved to the desired hole 92 in plate 88 which will rotate pipe 52 and change the tension in spring 74 and also, therefore, the depth of ground penetration of opener 69.

Adjustment relative to the ground is accomplished for planter unit 14 by rotating crank 42. This adjustment raises or lowers press wheel 46 relative to planter unit 14. Inasmuch as wheel 46 rests on the ground, the above adjustment actually raises or lowers the planter unit and thereby controls the depth of penetration of opener disks 152. Appropriate stop means which do not concern this invention is provided on hangers 32 to engage link members 34 and need not be further described. This stop means not shown merely supports the planter unit 14 and prevents it from contacting the ground when the implement has been raised for transportation.

A fertilizer drive shaft 210 is journaled in the bottom portion 62 of fertilizer unit 16 and is rotated by a chain 212 and a sprocket 214, from a sprocket 139 on shaft 138 as shown in FIG. 1. Shaft 210 actuates feeding means of well-known type not shown that provides a steady continuously controlled flow of fertilizer to opener shank 106, and which fertilizer is retained in the shank until the valve 114 is opened.

A general description of the operation of this invention will now be given:

As shown in FIG. 2, the fertilizer unit 16 is spaced forwardly of planter unit 14. In operation when the implement is propelled forwardly, the engagement of wheel 28 with the ground causes valve shaft 134 to rotate. Cam 168, being fixed to shaft 134 will also rotate and, in its rotation, will contact follower roller 186 on crank 180 and pivot the latter about stud 178. Valve rod 188 will then be shifted in the direction of arrow 216 as indicated in FIG. 2, and will open valve 114, thereby releasing the quantity of fertilizer that has dropped through tube 108 since the previous actuation of valve 114. This will deposit a body of fertilizer in the ground ahead of planter unit 14. At the time planter unit 14 reaches the vicinity of this body of fertilizer, the planter seed ejecting means is actuated to deposit the desired predetermined quantity of seed in the ground, this action occurring in the following manner.

Cam 162, in its rotation with shaft 134, engages follower roller 160 of valve plunger 154 and actuates the latter downwardly to deposit in the ground whatever seed has previously been released to seed tube 166 by the conventional seed metering means which is well known. As will be apparent, if the seed is to be deposited close to the fertilizer, it is important that the seed be dropped in correct timed relation to the dropping of the fertilizer, although a certain amount of tolerance in this respect is permissible. Furthermore, it is seldom desirable to deposit the seed in direct contact with the fertilizer and such action is readily avoided by the hereinbefore described lateral adjustment of fertilizer unit 16, by shifting collars 100 and 102 and shifting pipe 54 along its axis. In this way, the fertilizer unit is made to travel in a path a little to one side of that followed by the planter unit, and the amount of offset is easily adjusted by shifting pipe 54, as stated. In this way, the seed is deposited a little to one side of the fertilizer, and "burning" or other deleterious effects are avoided.

As the planter-fertilizer implement travels forwardly, the fertilizer unit and planter unit will deposit fertilizer and seed in timed relation so cordinated with the rate of travel that the seed will be placed in close proximity to the previously deposited fertilizer, the respective deposits being governed by the timing of the actuations of the valves by cams 168 and 162 and the relative position or adjustment of the fertilizer and planter units, laterally of the path of travel. In order to provide adjustment to change such proximity and to correct errors in timing, cam 168 is rotatably shifted on shaft 134 by loosening set screw 170, indicated in FIG. 5. When screw 170 is loosened, the cam 168 is rotated to the desired position and the screw 170 is then tightened.

Tie rod 176 maintains a constant distance between fertilizer opener 69 and arm 172. Inasmuch as crank 180 is pivoted on arm 172, any fore-and-aft displacement of either of units 14 and 16 owing to raising or lowering of these units will merely change the position of stud 178 relatively to cam 168, thereby advancing or retarding cam follower 186 angularly in relation to cam 168 so as to compensate for the change in spacing between the units and to disturb the timing to only a very limited extent if at all. Also as hereinbefore mentioned valve 114 of fertilizer opener 69, in the absence of this invention, might be suddenly opened even without the actuation of crank 180 if the opener were to strike an obstruction and be displaced rearwardly. This may be better understood if an arrangement is considered in which stud or fulcrum 178 would be fixed on shank 126 and tie 176 omitted. In such an arrangement, every change in longitudinal spacing between units 14 and 16 would rock crank arm 180 and alter the clearance between cam 168 and collar 186, thus causing a large change in the timing of the fertilizer valve, causing the valve to be operated either too soon, too late, or perhaps not at all, depending upon conditions. With the disclosed arrangement, when link 188 goes back, for example, by reason of tie 176, fulcrum 178 goes back also, and roller 186 remains at substantially the same distance from cam 168. However, the whole assemblage does swing about shaft 134, so as to advance the timing of the deposit of fertilizer to compensate for the momentary shorter distance between units 14 and 16. Thus it will be seen that this invention provides a planter-fertilizer unit that permits transverse and vertical adjustment for relative placement of fertilizer and seed, and means to adjust the timing and also means to prevent disturbance of the timing when one of the units strikes an obstruction.

Modifications and variations of the construction will occur to those skilled in the art, and it is desired to cover by the appended claims all such modifications as fall within the true spirit and scope of the invention.

I claim:

1. In a combined planter and fertilizer arrangement of the type including a frame supported for movement over the ground, means for propelling the frame along a row to be planted, a seed runner structure connected to said frame for up-and-down movement, a fertilizer runner structure connected to said frame for up-and-down movement independently of said seed runner structure and spaced from said seed runner in the direction of progress of said planter, the combination of a periodically operated valve means in said seed runner arranged for dropping a predetermined quantity of seed upon each operation thereof, periodically operated valve means in said fertilizer runner arranged for dropping a predetermined quantity of fertilizer upon each operation thereof, a rotatable shaft journaled in one of said runners, cam means on said shaft engageable with one of said valve means for momentarily opening the same during each revolution of said shaft, a depending arm pivoted on said shaft, a tie element pivotally connected to said arm at a point substantially vertically spaced from the point of pivotal connection of said arm with said shaft and extending in a generally fore-and-aft direction and pivotally connected to the other runner structure, a second cam on said shaft, a crank pivoted on said arm, a cam follower on said crank engaged with said second cam, and means connected with said crank and extending to said other valve means to open it momentarily upon each actuation of said crank by said second cam.

2. In a combined planter and fertilizer arrangement of the type including a frame supported for movement over the ground, means for propelling the frame along a row to be planted, a seed runner structure connected to said frame for up-and-down movement, a fertilizer runner structure connected to said frame, for up-and-down movement independently of said seed runner structure and spaced from said seed runner in the direction of progress of said planter, the combination of a valve means in said seed runner arranged for dropping a predetermined quantity of seed upon each operation thereof, valve means in said fertilizer runner arranged for dropping fertilizer upon each operation of said valve, a rotatable shaft journaled in one of said runners, cam means on said shaft engageable with one of said valve means for momentarily opening the same during each revolution of said shaft, a vertically disposed arm pivoted on said shaft, a tie element pivotally connected to said arm at a point spaced from the point of pivotal connection of said lever with said shaft and pivotally connected to the other runner structure, a second cam on said shaft, a crank pivoted on said arm and engaging said second cam, and means connected with said crank and extending to said other valve to open the latter momentarily upon each actuation of said rocker by said second cam.

3. In a combined planter and fertilizer arrangement of the type including a frame supported for movement over the ground, means for propelling the frame along a row to be planted, a seed runner structure connected to said frame for up-and-down movement, a fertilizer runner structure connected to said frame for up-and-down movement independently of said seed runner structure and spaced from said seed runner in the direction of progress of said planter; the combination of a valve means in said seed runner arranged for dropping a predetermined quantity of seed upon each actuation thereof, valve means in said fertilizer runner arranged for dropping a predetermined quantity of fertilizer upon each actuation thereof, a rotatable shaft journaled in one of said runners, cam means on said shaft engageable with one of said valve means for momentarily opening the same during each revolution of said shaft, a vertically disposed arm pivoted on said shaft, a tie element pivotally connected to said arm and extending in a generally fore-and-aft direction and pivotally connected to the other runner structure, a second cam on said shaft, a crank pivoted on said arm, a cam follower on said crank engaged with said second cam, and means connected with said crank and extended to said other valve to open it momentarily upon each actuation of said rocker by said second cam.

4. A combined seed planter and fertilizer distributor having a frame, a seed planting unit, and a fertilizer unit disposed in a spaced fore-and-aft relationship on said frame, said units being pivoted to said frame for independent vertical movement relative to said frame, a seed valve in said planting unit and a fertilizer valve in said fertilizer unit, means to actuate said valves in synchronization, comprising, in combination, a valve shaft rotatable in said planting unit, a seed planting cam, and a fertilizer cam secured to said shaft, seed valve operating means actuated by said seed planting cam, a depending arm journaled on said shaft, a fertilizer valve operating lever connected to said arm by a pivot and rotated about said pivot by said fertilizer cam, flexible anchor means extending between said fertilizer unit and the lower extremity of said arm to limit rotation of said arm about said shaft, an actuating link extending from said fertilizer valve to said fertilizer valve-operating lever at a point spaced from said pivot, and resilient means on said fertilizer unit biasing said fertilizer valve into a closed position.

5. In a planter the combination of a mobile frame, a planter boot connected to the frame for up-and-down movement, a fertilizer boot connected to the frame for up-and-down movement independently of said planter boot and spaced from the planter boot generally in the direction of progress of the planter, a seed valve means in the planter boot, a fertilizer valve means in the fertilizer boot, first means in one of said boots for actuating its respective valve means, second means in the other boot for actuating its respective valve means, a connection from the first means independent of said mobile frame to the second means for actuation thereof in response to actuation of the first means, and a connection means from said other boot to the first means operating to adjust said first means to compensate for changes in the spacing between said boots resulting from said up-and-down movement.

6. In a planter the combination of a mobile frame, a planter boot connected to the frame for up-and-down movement, a fertilizer boot connected to the frame for up-and-down movement independently of said planter boot and spaced from the planter boot generally in the direction of progress of the planter, a seed valve means in the planter boot, a fertilizer valve means in the fertilizer boot, first means in one of said boots for actuating its respective valve means, second means in the other boot for actuating its respective valve means, a connection from the first means to the second means for actuation thereof in response to actuation of the first means, and a connection means from said other boot to the first means operating to adjust said first means to compensate for changes in the spacing between said boots resulting from said up-and-down movement.

7. A combined seed planter and fertilizer distributor having a frame, a seed planting unit, and a fertilizer unit disposed in a spaced fore-and-aft relationship on said frame, said units having means for independent vertical movement relative to each other, a seed valve in said planting unit and a fertilizer valve in said fertilizer unit, means to actuate said valves in synchronization, comprising, in combination, a valve shaft rotatable in said planting unit, a seed planting cam, and a fertilizer cam secured to said shaft, seed valve operating means actuated by said seed planting cam, a depending arm journaled on said shaft, a fertilizer valve-operating lever connected to said arm by a pivot and rotated about said pivot by said fertilizer cam, rigid tie means extending between said fertilizer unit and said arm to limit rotation of said arm about said shaft, and an actauting link extending from said fertilizer valve to said fertilizer valve operating lever at a point spaced from said pivot.

8. A combined planter and fertilizer arrangement including a frame supported for movement over the ground,
means connected with the frame for propelling the frame along a row to be planted,
a seed runner structure,
means connected to said seed runner structure and to said frame and supporting said seed runner structure from said frame for up-and-down movement relative to said frame,
a fertilizer runner structure,
means connected to said fertilizer runner structure and to said frame and supporting said fertilizer runner structure from said frame for up-and-down movement relative to said frame independently of said seed runner structure, and spaced therefrom in the direction of progress of the planter and substantially
in alignment with said seed runner structure, a periodically operable
seed valve means in said seed runner structure arranged for depositing in said seed runner structure a predetermined quantity of seed upon each operation of said seed valve means, periodically operable
fertilizer valve means in said fertilizer runner structure arranged for depositing in said fertilizer runner structure a predetermined quantity of fertilizer upon each operation of said fertilizer valve means,
a rotatable shaft journaled in one of said runner structures, cam means fixed on said rotatable shaft in position to engage one of said valve means for momentarily opening the same during each revolution of said shaft,
a downwardly directed lever arm pivoted about said shaft,
a tie element,
means pivotally connecting said tie element to said lever arm at a point vertically spaced from said shaft, said tie element extending in a generally fore-and-aft direction,
means pivotally connecting said tie element to the other runner structure,
a second cam fixed on said shaft,
a fulcrum supported on said downwardly directed lever arm, spaced from said shaft,
a rocker lever pivoted on said fulcrum,
a cam follower on said rocker lever in position to be engaged with said second cam, and
means connected with said rocker lever, extending to the other valve means and responsive to rocking of said rocker lever to momentarily open said other valve means, whereby variations in the longitudinal spacing between said runners will cause swinging of said downwardly directed lever arm, shifting of said fulcrum about said rotatable shaft, and consequent adjustment of the timing, in relation to the rotation of said shaft, of the opening of said one valve in relation to said other valve.

9. A combined planter and fertilizer arrangement including a frame,
means connected with the frame and engaging the ground for supporting said frame for movement over the ground,
means connected with the frame for propelling the frame along a row to be planted,
a seed runner structure,
a fertilizer runner structure,
means connected to one of said runner structures and to said frame, and supporting said runner structure from said frame for up-and-down movement relative to said frame,
means connected to the other runner structure and to said frame and supporting said other runner structure from said frame and spaced from the first-mentioned runner structure in the direction of progress of the planter and substantially in alignment longitudinally with said first-mentioned runner structure,
a periodically operable seed valve means in said seed runner structure arranged for depositing in said seed runner structure a predetemined quantity of seed upon each operation of said seed valve means,
periodically operable fertilizer valve means in said fertilizer runner structure arranged for depositing in said fertilize runner structure a predetemined quantity of fertilizer upon each operation of said fertilizer valve means,
a rotatable shaft journaled in one of said runner structures, cam means fixed on said rotatable shaft in position to engage one of said valve means for momentarily opening the same during each revolution of said shaft,
a downwardly directed lever arm pivoted about said shaft,
a tie element,
means pivotally connecting said tie element to said lever arm at a point vertically spaced from said shaft, said tie element extending in a generally fore-and-aft direction,
means pivotally connecting said tie element to the other runner structure,
a second cam fixed on said shaft,
a fulcrum supported on said downwardly directed lever arm,
spaced from said shaft,
a rocker lever pivoted on said fulcrum,
a cam follower on said rocker lever in position to be engaged with said second cam, and
means connected with said rocker lever, extending to the other valve means and responsive to rocking of said rocker lever to momentarily open said other valve means, whereby variations in the longitudinal spacing between said runners will cause swinging of said downwardly directed lever arm, shifting of said fulcrum about said rotatable shaft, and consequent adjustment of the timing, in relation to the rotation of said shaft, of the opening of said one valve in relation to said other valve.

References Cited in the file of this patent
UNITED STATES PATENTS

| 1,905,767 | Traphagen | Apr. 25, 1933 |
| 1,906,351 | White | May 2, 1933 |
| 1,993,649 | Crutcher | Mar. 5, 1935 |
| 2,249,874 | White | July 22, 1941 |
| 2,319,758 | White | May 18, 1943 |